(12) United States Patent
Chang

(10) Patent No.: US 7,880,979 B2
(45) Date of Patent: Feb. 1, 2011

(54) APERTURE STOP AND MANUFACTURING METHOD THEREOF

(75) Inventor: Chia-Chun Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 143 days.

(21) Appl. No.: 12/342,234

(22) Filed: Dec. 23, 2008

(65) Prior Publication Data
US 2009/0303617 A1 Dec. 10, 2009

(51) Int. Cl.
*G02B 9/00* (2006.01)
(52) U.S. Cl. ........................ 359/739; 359/738
(58) Field of Classification Search ................. 359/739, 359/740, 738
See application file for complete search history.

(56) References Cited

U.S. PATENT DOCUMENTS

| | | | | |
|---|---|---|---|---|
| 5,251,974 | A * | 10/1993 | Beals | 312/330.1 |
| 6,695,437 | B2 * | 2/2004 | Nakamura et al. | 347/70 |
| 7,393,251 | B2 * | 7/2008 | Sakamaki et al. | 439/733.1 |
| 7,561,351 | B2 * | 7/2009 | Konno | 359/811 |
| 7,633,662 | B2 * | 12/2009 | Riley et al. | 359/35 |
| 7,656,582 | B2 * | 2/2010 | McGuire, Jr. | 359/499 |
| 7,687,783 | B2 * | 3/2010 | Platzgummer et al. | 250/396 R |
| 7,702,198 | B2 * | 4/2010 | Shibayama | 385/33 |
| 2006/0268243 | A1 * | 11/2006 | Woo et al. | 353/97 |

* cited by examiner

*Primary Examiner*—Timothy J Thompson
(74) *Attorney, Agent, or Firm*—Clifford O. Chi

(57) ABSTRACT

An aperture stop includes a body and a black film. The body is stainless steel and the black film is disposed on at least two corresponding ends of the body. A manufacturing method of the aperture stop is also provided. The aperture stop is produced using the characteristics of the stainless steel body.

2 Claims, 6 Drawing Sheets

A base which is made of stainless steel is provided, and the thickness of the base is between 0.01±0.005mm —S11

The base is stamped for forming a body of the aperture stop by a model knife —S12

The surface of the body is coated with a black film for forming the aperture stop —S13

FIG. 5

APERTURE STOP AND MANUFACTURING METHOD THEREOF

BACKGROUND

1. Technical Field

The invention relates to optical technology, and particularly to an aperture stop and manufacturing method thereof.

2. Description of Related Art

Referring to FIG. 6, an optical lens module 10 has a first lens L1, a second lens L2 and an aperture stop St. The aperture stop St is disposed between the first lens L1 and the second lens L2, and the optical centers of the aperture stop St, the first lens L1 and the second lens L2 are aligned. Given that total thickness of the optical lens module 10 is constant, costs of the first lens L1 and the second lens L2 are affected by the thickness of the aperture stop St accordingly. For example, if the aperture stop St is very thick, the thickness of the first lens L1 and the second lens L2 must be reduced. Shapes of the first lens L1 and the second lens L2, however, create difficultly in the manufacturing process. Further, as the volume of the optical lens module 10 reduced, there is a requirement for the thickness of the first lens L1 and the second lens L2 to be reduced accordingly.

Thickness of the aperture stop St is generally 0.029 mm. Further reduction of the thickness of the aperture stop St cannot be achieved, due to the limitations of the constituent glass or plastic material, whereby breakage or deformation are likely in the manufacturing process.

What is needed, therefore, is an aperture stop and manufacturing method thereof achieving desired thinness with strength and integrity maintained.

BRIEF DESCRIPTION OF THE DRAWINGS

FIG. 5 is a flowchart of a manufacturing method for the aperture stop, in accordance with the second embodiment.

DETAILED DESCRIPTION

Figure 1:
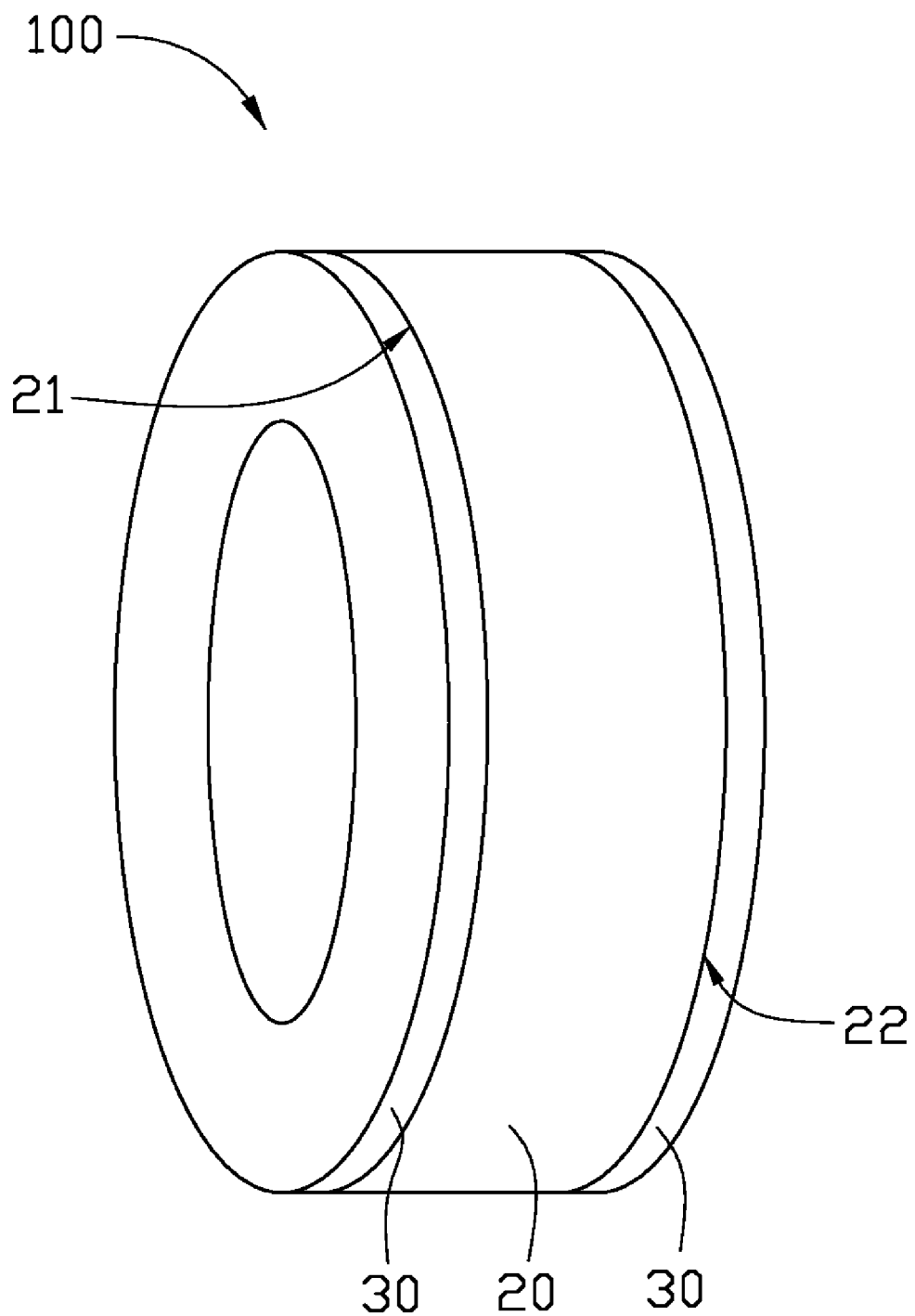
FIG. 1 is a schematic view of an aperture stop, in accordance with an embodiment.

Referring to FIG. 1, an aperture stop 100 of an embodiment includes a body 20 and a black film 30. The body 20 includes two ends 21, 22. The black film 30 is disposed on at least one surface of the ends 21, 22 of the body 20.

The body 20 can be stainless steel and is ring-shaped. The stainless steel is rigid enough to protect the body 20 from deformation, such that thickness of the body 20 can be achieved in a range of 0.01±0.005 mm. In other words, the thickness of the body is in the range from 0.005 mm to 0.015 mm. The surfaces of two the ends 21, 22 of the body 20, coated with the black film 30, reduce light reflection from the surface of the body 20, with such reflected light, from scattered stray light or edge diffraction light seriously affecting image quality.

The black film 30, coating the outer faces of the ends 21, 22 of the body 20, can further extend to coat the side surfaces of the body 20, but is not required to do so in order to achieve the aims of the disclosure. The black film 30 can be a black chrome layer, a black aluminum layer, or zinc-nickel alloy coated layer. Here, the thickness of the black film 30 is about 0.001 mm, and the total thickness of the aperture stop 100 is about 0.01±0.005 mm.

Thickness of the stainless steel body 20 is not limited in the manufacturing process, allowing the aperture stop 100 to be 50% thinner than commonly used aperture stops, or more.

Figure 2:
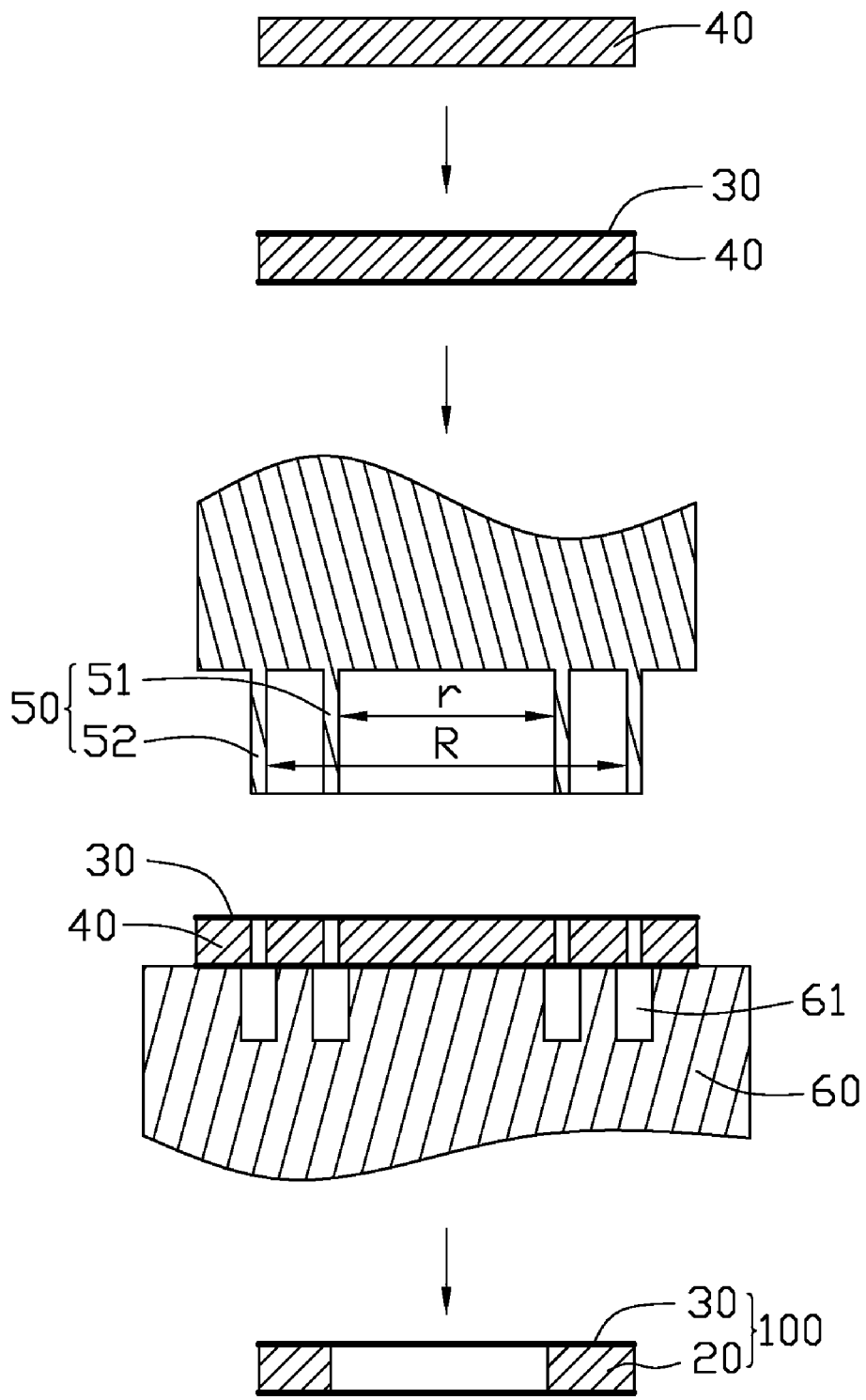
FIG. 2 is a schematic view showing a process for manufacturing an aperture stop, in accordance with a first embodiment.
Figure 3:
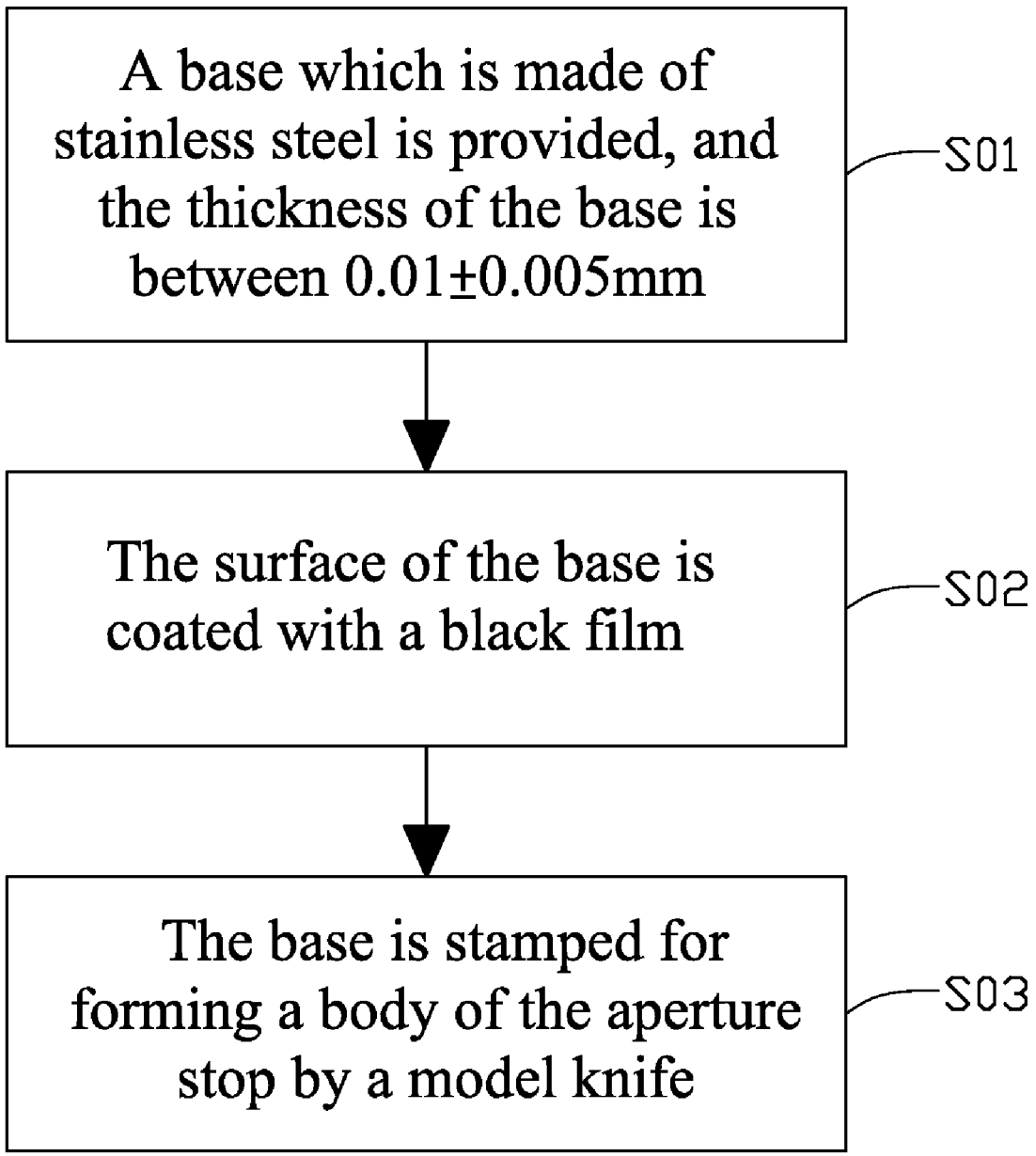
FIG. 3 is a flowchart of a manufacturing method for the aperture stop, in accordance with the first embodiment.

A first embodiment of a manufacturing method of the aperture stop 100, as shown in FIGS. 2 and 3, includes, in step S01, providing a base 40 of stainless steel having a thickness of 0.01±0.005 mm. In other words, the thickness of the base is in the range from 0.005 mm to 0.015 mm.

In step S02, the surface of the base 40 is coated with a black film 30.

In step S03, the base 40 is stamped to form a body 20 of the aperture stop 100, using a die or cutting knife.

In die stamping technology, a male model 50 and a female model 60 are used. The male model 50 includes an inside ring knife 51 and an outside ring knife 52, and the inside diameter r of the inside ring knife 51 is same as the inside diameter of the aperture stop 100, and the outside diameter R of the outside ring knife 52 is the same as the outside diameter of the aperture stop 100, and there is a space between the inside ring knife 51 and the outside ring knife 52. The female model 60 has two cylindrical recesses 61 receiving the inside ring knife 51 and the outside ring knife 52. Therefore, the aperture stop 100 constitutes the male model 50 and the female model 60 in cooperation.

In the first embodiment of the aperture stop 100, only the surfaces of the ends 21, 22 of the body 20 are coated with the black film 30, as shown in FIG. 1.

Figure 4:
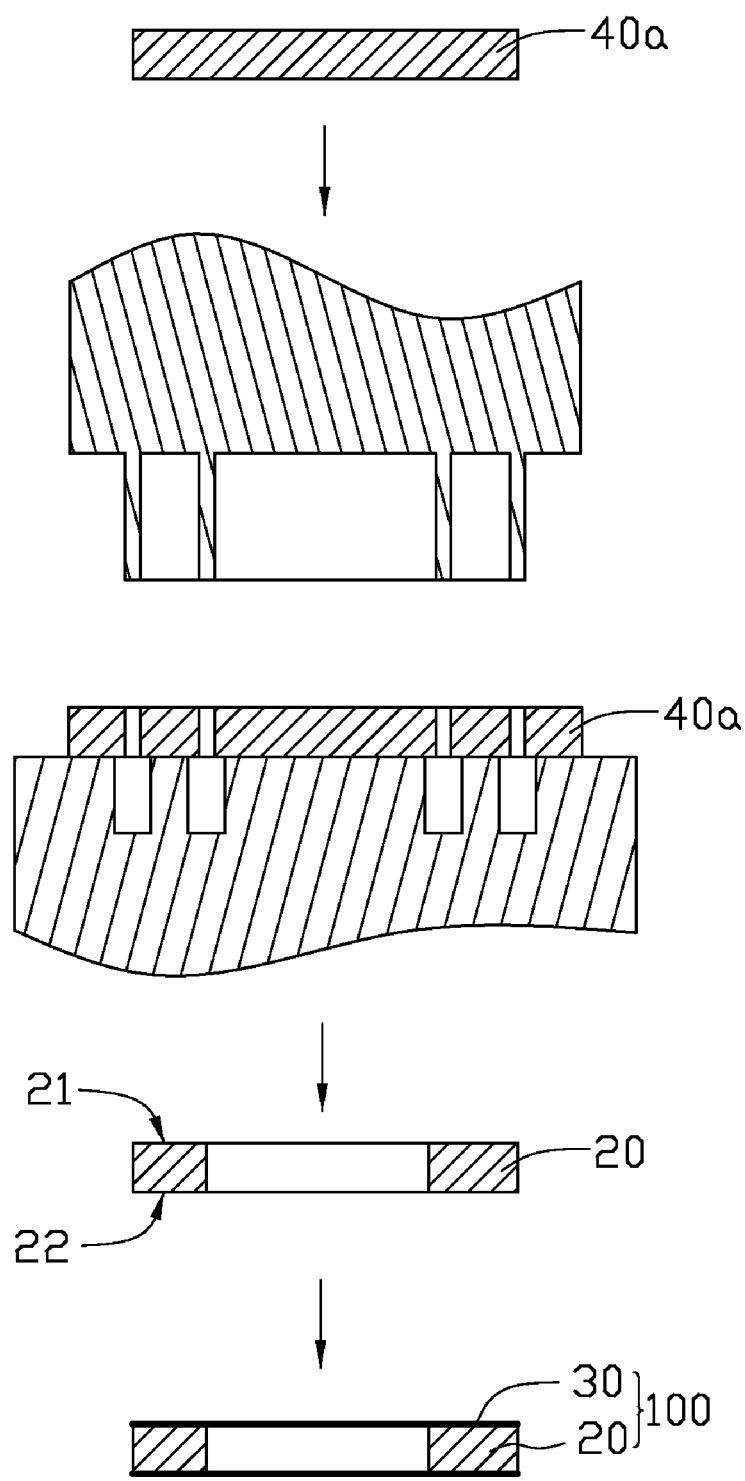
FIG. 4 is a schematic view showing a process for manufacturing an aperture stop, in accordance with a second embodiment.
Figure 6:
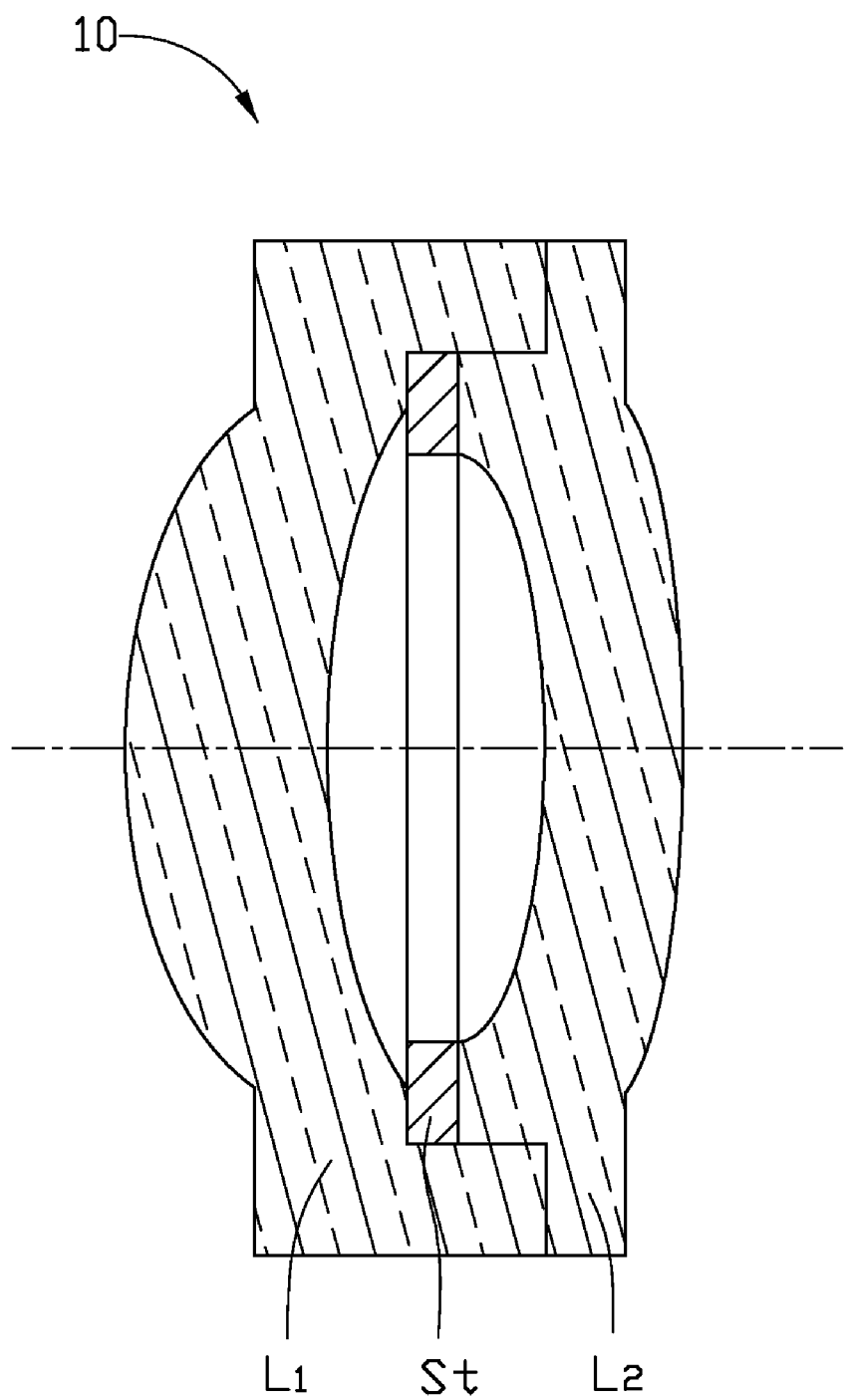
FIG. 6 is a cross-section of a commonly used aperture stop.

A second embodiment of a manufacturing method of the aperture stop 100, as shown in FIGS. 4 and 5, includes, in step S11, providing a base 40a of stainless steel having a thickness of 0.01±0.005 mm.

In step S12, the base is stamped by a die to form a body 20 of the aperture stop 100.

In step S13, the surface of the body 20 is coated with a black film 30 to form the aperture stop 100.

Unlike the previous embodiment, here, the black film 30 not only coats the faces of the ends 21, 22 of the body 20, but also coats the side surfaces thereof.

According to the disclosure, the body 20, of stainless steel, is not limited in thickness for the manufacturing process, being able to achieve a decrease of 50% or more in thinness over commonly used aperture stops, and application of black film 30 reduces the reflected light of the surface of body 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An aperture stop, comprising:
   a flat body comprised of stainless steel; and
   a black film formed on opposite sides of the body, wherein a side surface of the flat body is not coated by the black film, wherein the thickness of the body is in the range from 0.005 mm to 0.015 mm.

2. A manufacturing method of an aperture stop, comprising:
   providing a stainless steel base;
   forming a black film on opposite sides of the base; and
   stamping the base to define a through hole therein, wherein the thickness of the base is in the range from 0.005 mm to 0.015 mm.

* * * * *